(12) United States Patent
Johnson et al.

(10) Patent No.: US 9,917,465 B2
(45) Date of Patent: *Mar. 13, 2018

(54) BATTERY EXERCISING DEVICE

(71) Applicant: Johnson Industries, Inc., Pikeville, KY (US)

(72) Inventors: George F. Johnson, Pikeville, KY (US); Mark A. DiLuciano, Kingsport, TN (US)

(73) Assignee: Johnson Industries, Inc., Pikeville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,298

(22) Filed: Jun. 16, 2017

(65) Prior Publication Data

US 2017/0288420 A1    Oct. 5, 2017

Related U.S. Application Data

(63) Continuation of application No. 15/346,007, filed on Nov. 8, 2016, now Pat. No. 9,705,351.

(Continued)

(51) Int. Cl.
*H02J 7/00* (2006.01)

(52) U.S. Cl.
CPC ............ *H02J 7/007* (2013.01); *H02J 7/0047* (2013.01); *H02J 7/0068* (2013.01)

(58) Field of Classification Search
CPC .................................................... H02J 7/0073

(Continued)

(56) References Cited

U.S. PATENT DOCUMENTS

| 4,755,733 A | * | 7/1988 | Laliberte | ............... | H02J 7/0022 |
| | | | | | 320/125 |
| 5,151,644 A | | 9/1992 | Pearson et al. | | |

(Continued)

FOREIGN PATENT DOCUMENTS

| JP | H06-54451 A | 2/1994 |
| WO | WO 90/03682 | 4/1990 |

OTHER PUBLICATIONS

"Battery Desulfator, Battery Reconditioner: Restore and Maintain Your Batteries in Top Condition," Sakura Batteries UK, Mar. 24, 2015, downloaded from http://web.archive.org/web/20150324015243/http://www.recovermybatteries.com/, Nov. 11, 2016, 2 pgs.

(Continued)

*Primary Examiner* — Yalkew Fantu
(74) *Attorney, Agent, or Firm* — Frost Brown Todd LLC

(57) ABSTRACT

The disclosure relates to a battery exercising device configured to discharge and charge a rechargeable battery, such as a lead-acid battery, after a set amount of time has elapsed. The battery exercising device is configured to receive electrical power from a power source and periodically transfer this power into a battery connected to the battery exercising device. After a period has elapsed, for example two weeks, the device applies a discharging load to the connected battery to drain the battery to a predetermined discharge level. Thereafter, the device charges the connected battery to a predetermined charge level. Once charged to the predetermined charge level, the device again waits the set period of time and repeats the discharge/recharge sequence.

20 Claims, 7 Drawing Sheets

Related U.S. Application Data

(60) Provisional application No. 62/285,777, filed on Nov. 9, 2015.

(58) Field of Classification Search
USPC .................................................... 320/133
See application file for complete search history.

(56) References Cited

U.S. PATENT DOCUMENTS

| | | | |
|---|---|---|---|
| 5,196,779 A | 3/1993 | Alexandres et al. | |
| 5,331,268 A | 7/1994 | Patino et al. | |
| 5,350,995 A | 9/1994 | Iketani | |
| 5,449,997 A | 9/1995 | Gilmore et al. | |
| 5,475,294 A | 12/1995 | Isoda | |
| 5,481,174 A | 1/1996 | Martin et al. | |
| 5,514,946 A | 5/1996 | Lin et al. | |
| 5,608,306 A | 3/1997 | Rybeck et al. | |
| 5,710,506 A | 1/1998 | Broell et al. | |
| 5,747,970 A | 5/1998 | Johnson, Jr. et al. | |
| 5,754,029 A | 5/1998 | Mann et al. | |
| 5,767,659 A | 6/1998 | Farley | |
| 6,091,227 A | 7/2000 | Beard | |
| 6,388,425 B1 * | 5/2002 | Petrovic | H02J 7/0093 320/130 |
| 6,462,514 B2 | 10/2002 | Maloizel | |
| 6,771,042 B2 | 8/2004 | Chen et al. | |
| 7,282,891 B2 | 10/2007 | Smallwood et al. | |
| 7,710,072 B2 * | 5/2010 | Ibrahim | H02J 7/0063 320/127 |
| 8,164,468 B2 * | 4/2012 | Gofman | A61B 5/14532 340/573.1 |
| 2002/0021108 A1 | 2/2002 | Suzuki et al. | |
| 2005/0225299 A1 | 10/2005 | Petrovic | |
| 2005/0248313 A1 * | 11/2005 | Thorland | H02J 7/0075 320/130 |
| 2017/0133861 A1 | 5/2017 | Johnson et al. | |

OTHER PUBLICATIONS

"Battery Recovery, Reconditioning Desulfation and Maintenance . . . Made Easy! Battery Reconditioner, Battery Desulfator, Battery Rejuvenator Restore or Maintain Your Lead Acid Batteries in Top Condition," Battery Extra, Corby Northants, UK, Mar. 30, 2016, downloaded from http://recovermybatteries,com/index.html, Nov. 11, 2016, 31 pgs.

"Lead-acid battery," Wikipedia, modified May 30, 2015, downloaded from http://web. archive.org/web/20150603091321/http://en.m.wikipedia.org/wiki/Lead%E2%80%93acid_battery, Nov. 11, 2016, 19 pgs.

"Lee Hart's Battery Charging Basics," VDL Electric Vehicle Discussion List, Dec 6, 2011, downloaded from http://www.evdl.org/pages/hartcharge.html, Nov. 11, 2016, 3 pgs.

"Storage Battery Maintenance and Principles," Facilities Instructions, Standards, and Techniques, vol. 3-6, p. 13, Internet Version created Jun. 1998, Hydroelectric Research and Technical Services Group, US Dept. of the Interior, Bureau of Reclamation, Denver, Colorado, 83 pgs.

International Search Report and Written Opinion dated Mar. 3, 2017 for Application No. PCT/US2016/060937, 13 pgs.

* cited by examiner

BATTERY EXERCISING DEVICE

PRIORITY

This application is a continuation application of U.S. Nonprovisional Patent Application Ser. No. 15/346,007, filed Nov. 8, 2016, entitled "BATTERY EXERCISING DEVICE," which claims priority to U.S. Provisional Patent Application Ser. No. 62/285,777, filed Nov. 9, 2015, entitled "AUTOMATIC TIMED BATTERY CHARGE/DISCHARGE EVENT CONTROLLER," the disclosures of which are incorporated by reference herein.

BACKGROUND

In some commercial and residential situations, rechargeable batteries such as those used in golf carts, boats, mining machinery, or other devices may sit unused for an extended period of time. As such, the battery may slowly drain, lose its charge, and be unable to provide power when the need eventually arises. In an effort to maintain a continuous full charge in the battery, some battery chargers provide a float charge after the battery is fully charged to continuously "top off" the battery charge. However, the required float charge is directly dependent on the temperature of the battery and thus needs to dynamically change to account for changes in the temperature of the battery. For example, the required float charge at night can be different from the required float charge during the day due to daily temperature differences. Therefore, some of these types of battery chargers require internal logic and temperature sensing components to constantly maintain a proper charge in the underlying battery. Further, some of these types of battery chargers require constant power from an outside source to continuously apply a float charge to the battery. However, when a power outage occurs, the battery can begin to discharge naturally and lose voltage. Oftentimes the battery may have only partially discharged when the power returns and the battery begins recharging.

While a variety of battery chargers have been made and used, it is believed that no one prior to the inventors have made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
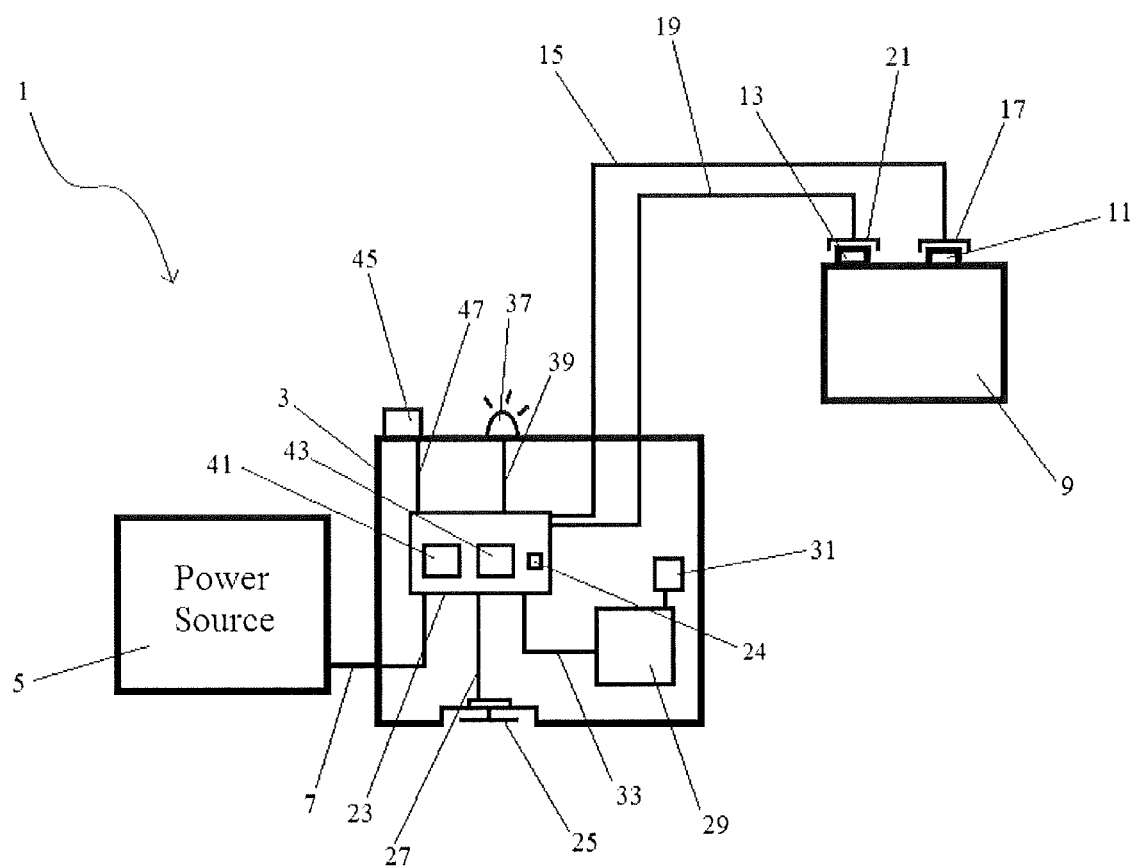
FIG. 1 depicts a diagrammatical view of an exemplary battery exercising device.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Battery Exercising Device

FIG. 1 depicts an embodiment of a device configured to periodically charge and discharge a battery, referred to herein after as battery exercising device (1). Battery exercising device (1) includes a housing (3) which provides a protective outer shell and may include features such as handles (not shown) or feet (not shown). Outer shell may be rigid and may feature any rigid nonflammable materials, including but not limited to steel or aluminum. Battery exercising device (1) is configured to receive power from a power source (5), including but not limited to conventional electrical outlets and renewable power sources such as solar panels and wind turbines. Power (i.e., electricity) from power source (5) is supplied through a power cord (7) or a similar wiring arrangement. Power cord (7) may be integrated with housing (3) or may be detachable from housing (3). Power source (5) may be a wall outlet or another mechanical structure for coupling with power cord (7) and delivering electrical power to battery exercising device (1).

Battery exercising device (1) is configured to recharge a battery (9), such as a lead-acid battery, referred to hereinafter as rechargeable battery (9) or battery (9). In the illustrated embodiment, rechargeable battery (9) includes a positive terminal (11), a negative terminal (13), and internal elements well known in the art for providing battery generated electrical current through terminals (11, 13) as needed or for receiving electrical input to charge battery (9). A positive wire (15) extends from housing (3) at a proximal end and includes a positive lead (17) at the distal end. Positive lead (17) is configured to electrically couple with positive terminal (11) and may be in the form of a clamp or any other similar connector element. Similarly, a negative wire (19) extends from housing (3) at a proximal end and includes a negative lead (21) at the distal end. Negative lead (21) is configured to electrically couple with negative terminal (13) and may be in the form of a clamp or any other similar connector element.

In some embodiments of battery exercising device (1), rather than being a "one-to-one" configuration for charging one battery (9), various features and circuitry may be provided to enable a "one-to-many" configuration and allow battery exercising device (1) to service multiple batteries, all coupled with battery exercising device (1). To facilitate charging multiple batteries, more than one positive wire (15) and more than one negative wire (19) may extend from housing (3) to be coupled with a respective battery as needed. Further, each pair of positive wire (15) and negative wire (19) may provide different terminal ends or heads, similar to positive lead (17) and negative lead (19) to allow coupling with different styles of batteries. Still further, battery exercising device (1) may charge and discharge a plurality of batteries wired together in a series circuit style, wherein each battery is similar to battery (9), such as the battery system used in an electric golf cart for example.

In the illustrated embodiment, positive wire (15) and negative wire (19) are electrically coupled with a control unit (23) disposed inside housing (3). Control unit (23) may comprise circuitry and/or electrical components operable to convey appropriate voltages and currents from power source (5) through wires (15, 19) as necessary to selectively discharge or charge battery (9). Control unit (23) may comprise a processing component (24), such as one or more of a microcontroller, including but not limited to a PIC microcontroller or other similar circuit, a microprocessor, or other similar processing devices configured to receive inputs, such as signals from input mechanism (45) and signals from one or more timers and/or sensors. Processing component (24) may include a CPU programmed to make decisions regarding what to do when it receives inputs, such as signals from input mechanism (45) and signals from one or more sensors, timers and/or counters included within exercise device (1). Control unit (23) may use logic, such as that shown in FIG. 2 and described below, to determine whether to selectively discharge or charge battery (9). That logic may be stored in and executed by the processing component (24) of control unit (23).

In some embodiments of battery exercising device (1), a fan (25) is disposed in housing (3) to provide cooling to battery exercising device. Housing (3) can also be constructed to include or define openings or vents to provide ventilation to assist with cooling. In this embodiment, fan (25) is electronically coupled to control unit (23) through fan circuitry (27) and controllable there through to selectively actuate fan (25) as needed to cool the internal chamber of housing (3) and the components disposed therein.

As shown, real time clock (29) is disposed in housing (3) to provide a continuous reliable timing element for battery exercising device (1). A real time clock can be a computer clock that keeps track of the current date, time, and day of week, and may be in the form an integrated circuit. Information provided by real time clock (29) is used by control unit (23) to determine when to initiate a charge or discharge cycle of battery (9) and also to limit the time period of both charge and discharge cycles. Real time clock (29) may use a crystal oscillator or a power line frequency or any other mechanism suitable for tracking time and providing this information to control unit (23). As shown, real time clock (29) is powered by a clock battery (31), which may be a replaceable and/or rechargeable lithium-ion style battery or any other suitable power source. Clock battery (31) can provide continuous power to real time clock (29) regardless of the operation or connection of power source (5). Thus, if power source (5) experiences a temporary power outage or other disruption in the supply of power, real time clock (29) continues to operate and account for the passage of time. Once power source (5) resumes operation or recovers from the power outage, clock battery (31) allows real time clock (29) and battery exercising device (1) to resume operation and continue operations without a disruption or delay in the time monitoring capabilities of the device (1).

As shown, real time clock (29) is electronically coupled with control unit (23) through clock circuitry (33), which allows information signals to pass between control unit (23) and real time clock (29). The determination of whether a predetermined wait period has elapsed may be made either by control unit (23) or real time clock (29). In some embodiments of battery exercising device (1), control unit (23) is programmed to periodically poll real time clock (29) for timing data such as timestamps and determines whether to initiate a charge or discharge cycle based upon this collected information. The timing data may include information regarding the current date and/or time. In some other embodiments of battery exercising device (1), real time clock (29) may determine when the predetermined wait period has expired and initiates an interrupt to control unit (23) to communicate this information and actuate control unit (23) to initiate a charge or discharge cycle. The predetermined wait period may be in the form of a specific date and/or time, such as Aug. 5, 2016, or may be in the form of a relative offset of time, such as "200 hours from now," or may be a repetitive wait period such as "every 3 weeks" or "every 200 hours." Real time clock (29) works in conjunction with processing component (24) of control unit (23) to facilitate timing related tasks and to determine when a particular period is elapsed. Utilizing a wait period that comprises a substantial amount of time, such as weeks or months, as opposed to seconds or minutes, may be useful for certain types of batteries, such as lead-acid batteries. By way of example, the wait period may comprise at least one day, preferably at least one week, more preferably at least two weeks, and still more preferably at least one month. In some embodiments, the wait period may comprise a time period within the range of about two weeks to about three months.

Some embodiments of battery exercising device (1) include an input mechanism (45). The user may actuate input mechanism (45) to configure and customize the predetermined wait period, which is the desired amount of time to wait between the end of a charge cycle and the beginning of the next discharge cycle to be performed by battery exercising device (1). In some embodiments, input mechanism (45) may comprise a knob, a button, a touch screen, or any other element for configuring and inputting wait period information into battery exercising device (1). Input mechanism (45) may comprise an external device, such as a smartphone, tablet, or computer that communicates with control unit (23) via a wired and/or wireless connection to control unit (23). For example, housing (3) may include a USB-style jack (not shown) for use in wired communication between control unit (23) and a laptop computer. In embodiments where input mechanism (45) comprises an external device that can communicate with control unit (23) via a wireless connection, the device (1) may include a wireless module, which may include a receiver, configured to allow the external device to communicate with control unit (23). The wireless connection may utilize any suitable wireless communication technology, including but not limited to Bluetooth technology. The user may then manipulate the wait period information via the laptop computer. Input mechanism (45) may comprise both an internal input device such as a knob, as well as a device for receiving period information through an external input via a wired and/or wireless connection to control unit (23). Some embodiments of battery exercising device (1) may also allow a user to provide other information via input mechanism (45) such as selecting the type of battery amp hour, such as a marine amp hour or a crank amp hour. In some embodiments input mechanism (45) may comprise more than one input device, such as multiple knobs, buttons, touch screens, or combinations thereof.

In the illustrated embodiment, input mechanism (45) is electrically coupled with control unit (23) through an input mechanism circuit (47) configured to communicate the wait period selection information from input mechanism (45) to control unit (23). In other embodiments of battery exercising device (1), the wait period for waiting between charge cycles may be stored in or accessible by control unit (23). In these embodiments, input mechanism (45) and input mechanism circuit (47) can be omitted. In some other embodiments, the wait period can be set to a default value stored in or accessible to control unit (23) unless and until the user changes the wait period through input mechanism (45).

As discussed previously, some embodiments of battery exercising device (1) may feature a "one-to-many" configuration and provide for charging multiple batteries. In some embodiments, each connected battery is associated with the overall wait period, which applies to every connected battery. Therefore, if a battery is added to the battery exercising device (1) in the middle of a wait period, that battery is charged at the expiration of the wait period, regardless of the actual charge of the battery. Further, each battery is serviced in succession, whereby once the discharge/charge cycle finishes for a first battery, battery exercising device (1) begins the discharge/charge cycle for a second battery. Battery exercising device (1) then continues to consecutively discharge/charge each battery connected to battery exercising device (1) until all batteries are serviced. Battery exercising device (1) may be configured to allow for different waiting periods for different batteries connected to battery exercising device (1) by incorporating necessary additional mechanical features such as multiple input mechanisms (45) or any other elements necessary to facilitate disparate waiting periods for multiple batteries.

In some embodiments, input mechanism (45) may also allow the user to initiate an immediate discharging and/or charging of battery (9), regardless of whether the wait period for waiting between charge cycles has expired. When the user initiates an immediate discharge/charge of battery (9), control unit (23) is programmed to proceed as if the wait period has expired, as described above. Therefore, control unit (23) proceeds to discharge battery (9) as needed to the discharge level and thereafter charges battery (9) to the charge level. This feature allows a user to immediately start the discharge/charge cycling of battery (9) as needed. In some embodiments, instead of or in addition to using input mechanism (45) to manually initiate a discharging and/or charging of the battery, device (1) may include a separate manual initiation mechanism configured to allow a user to manually initiate a discharging and/or charging of the battery. The separate manual initiation mechanism could be an internal mechanism that is built into the device (1), such as a knob, button, touch screen, or any other suitable internal input mechanism or an external mechanism, such as a smartphone, tablet, computer, or any other suitable external input mechanism. In embodiments that comprise an external input mechanism, the external input mechanism may communicate with control unit (23) via a wired and/or wireless connection to control unit (23). For example, housing (3) may include a USB-style jack (not shown) for use in wired communication between control unit (23) and a laptop computer. In embodiments where the external input mechanism can communicate with control unit (23) via a wireless connection, the device (1) may include a wireless module, which may include a receiver, configured to allow the external device to communicate with control unit (23). The wireless connection may utilize any suitable wireless communication technology, including but not limited to Bluetooth technology.

A feedback mechanism (37) may be incorporated into battery exercising device (1). Feedback mechanism (37) may be configured to provide feedback, such as audio or visual indications, to a user regarding one or more pieces of information about the battery exercising device (1) and/or battery (9). By way of example only, feedback mechanism (37) may provide audio or visual indications regarding the mode of the battery exercising device (1) (e.g., whether battery exercising device (1) is in a wait mode, discharge mode, rest mode, or charge mode), whether battery exercising device (1) is receiving power from power source (5), whether battery (9) has reached the predetermined discharge level or charge level, the progress of the charging or discharging cycle relative to the predetermined charge level or discharge level, and other similar types of information.

Feedback mechanism (37) may comprise a light, including but not limited to an LED light, connected to control unit (23) by way of a light circuit (39). In some embodiments where feedback mechanism (37) comprises a light, control unit (23) may be programmed to actuate feedback mechanism (37) to illuminate in a first color when rechargeable battery (9) is being charged (i.e., when battery exercising device (1) is in charge mode) and illuminate in a second color when rechargeable battery (9) is being discharged (i.e., when battery exercising device (1) is in discharge mode). In some embodiments of device (1), additional colors, flashing patterns, or other indicia may be provided via feedback mechanism (37) for indicating the state of the charging and/or discharging. For example, a set of three out of five rectangular shaped bars may be illuminated to indicate the charge cycle is three-fifths complete. In other embodiments of device (1), feedback mechanism (37) may comprise a display screen for providing feedback information to the user, including but not limited to alphanumeric messages or error codes. In other embodiments of device (1), feedback mechanism (37) may comprise a speaker for emitting an audible tone, beep or other sound for providing feedback information to the user. In some embodiments, device (1) may include more than one feedback mechanism, including but not limited to two or more lights, two or more speakers, or a combination of two or more lights, speakers, and displays.

When the desired wait period has elapsed, control unit (23) is programmed to initiate a discharge mode using a discharge circuit (41) to lower the voltage in battery (9). Discharge circuit (41) comprises electronic circuitry for use in draining voltage from battery (9) by allowing exercising device (1) to apply a load to battery (9) in order to drain battery (9). In some embodiments of battery exercising device (1), during the discharge mode, control unit (23) discharges battery (9) to a pre-determined voltage level, referred to hereinafter as a discharge level, which may be set by the user. In some embodiments, the duration of the discharge mode or cycle may be limited by a time limit, such as a specific number of minutes, hours, days, specific date, etc., which may also be set by the user. Allowing the discharge cycle to take place over a substantial amount of time, such as days, weeks or months, as opposed to seconds or minutes, may be useful for certain types of batteries, such as lead-acid batteries. The user may set and update the discharge level and, when applicable, the time limit for the discharge cycle through any common mechanism for interfacing with control unit (23), including through a wired connection, such as a USB port, or through a wireless connection, such as a Bluetooth® module. In some embodiments, input mechanism (45) may also allow for the user to set and update the discharge level. Various hardware, circuitry, and/or programming components of battery exercising device (1) may be modified as needed and as known within the art to allow this to be accomplished via input mechanism (45).

In some embodiments, the discharge level can be greater than zero volts or substantially equal to zero volts. In embodiments where the discharge level is substantially equal to zero volts, control unit (23) fully discharges battery (9), or in other words, discharges battery (9) until the voltage substantially equals zero volts. Control unit (23) may be programmed to periodically determine the present voltage level of battery (9) to determine the status of the discharge and whether the discharge level has been reached. The voltage level of battery (9) may be determined through a voltage divider circuit which feeds an analog digital conversion circuit or equivalent circuitry. Sensors may also be utilized to determine the present voltage level of battery (9). In embodiments where a time limit is utilized by control unit (23) to control the length of the discharge cycle, then control unit (23) may also be programmed to periodically check a timer to determine if the time limit has elapsed.

After the discharge mode is completed (i.e., the voltage level has reached the discharge level and/or the time limit for the discharge cycle has elapsed) and, in some embodiments, after an optional rest period, control unit (23) is programmed to initiate a charge mode using a charge circuit (43). Charge circuit (43) comprises electronic circuitry for use in increasing the voltage of battery (9) or otherwise recharging battery (9) by allowing exercising device (1) to provide a charging current to battery (9). During charge mode, control unit (23) charges battery (9) until the unit is fully recharged or until battery (9) has reached a pre-determined voltage level, referred to hereinafter as a charge level. In some embodiments, the duration of the charge mode or cycle may be limited by a time limit, such as a specific number of minutes, hours, days, specific date, etc., which may also be set by the user. Allowing the charge cycle to take place over a substantial amount of time, such as days, weeks or months, as opposed to seconds or minutes, may be useful for certain types of batteries, such as lead-acid batteries. The user may set and update the charge level and, when applicable, the time limit for the discharge cycle through any common mechanism for interfacing with control unit (23), including through a wired connection, such as a USB port, or through a wireless connection, such as a Bluetooth® module. In some embodiments, input mechanism (45) may also allow for the user to set and update the charge level.

In some embodiments, the charge level can be less than or substantially equal to the full voltage capacity of battery (9). In embodiments where the charge level is substantially equal to the full voltage capacity of battery (9), control unit (23) fully charges battery (9), or in other words, charges battery (9) until the voltage is substantially equal to the full voltage capacity of battery (9). Control unit (23) may be programmed to periodically determine the present voltage level of battery (9) to determine the status of the recharge and whether the desired charge level has been reached. As stated above, the voltage level of battery (9) may be determined through a voltage divider circuit which feeds an analog digital conversion circuit or equivalent circuitry. Also as stated above, sensors may also be utilized to determine the present voltage level of battery (9). In embodiments where a time limit is utilized by control unit (23) to control the length of the charge cycle, then control unit (23) may also be programmed to periodically check a timer to determine if the time limit has elapsed. Once the charge cycle is completed (i.e., battery (9) is recharged to the charge level and/or the time limit for the charge cycle has elapsed), the internal timer for the wait period is reset in the processing component (24) and the process of waiting for the wait period to elapse, discharging battery (9) to the discharge level, and recharging battery (9) to the charge level repeats.

In some embodiments, battery exercising device (1) may be configured to charge battery (9) using constant current with an upper voltage cutoff. In other words, battery exercising device (1) may be configured to charge battery (9) by providing power to battery (9) at a constant current until a predetermined voltage limit is reached, and then charging is stopped. In other embodiments, battery exercising device (1) may be configured to charge battery (9) using a combination of constant current and constant voltage, similar to current smart chargers. In such an embodiment, battery exercising device (1) may be configured to charge battery (9) using constant current first and then switch to charging battery (9) using constant voltage during the charge cycle. In such embodiments, when battery exercising device (1) is charging battery (9) using constant voltage, the battery exercising device (1) may provide power to battery (9) at a constant voltage until the current reaches a certain threshold, such as substantially zero amps. Various hardware, circuitry, and/or programming components of battery exercising device (1) may be modified as needed and as known within the art to provide the desired current and voltage features described herein.

Figure 3:
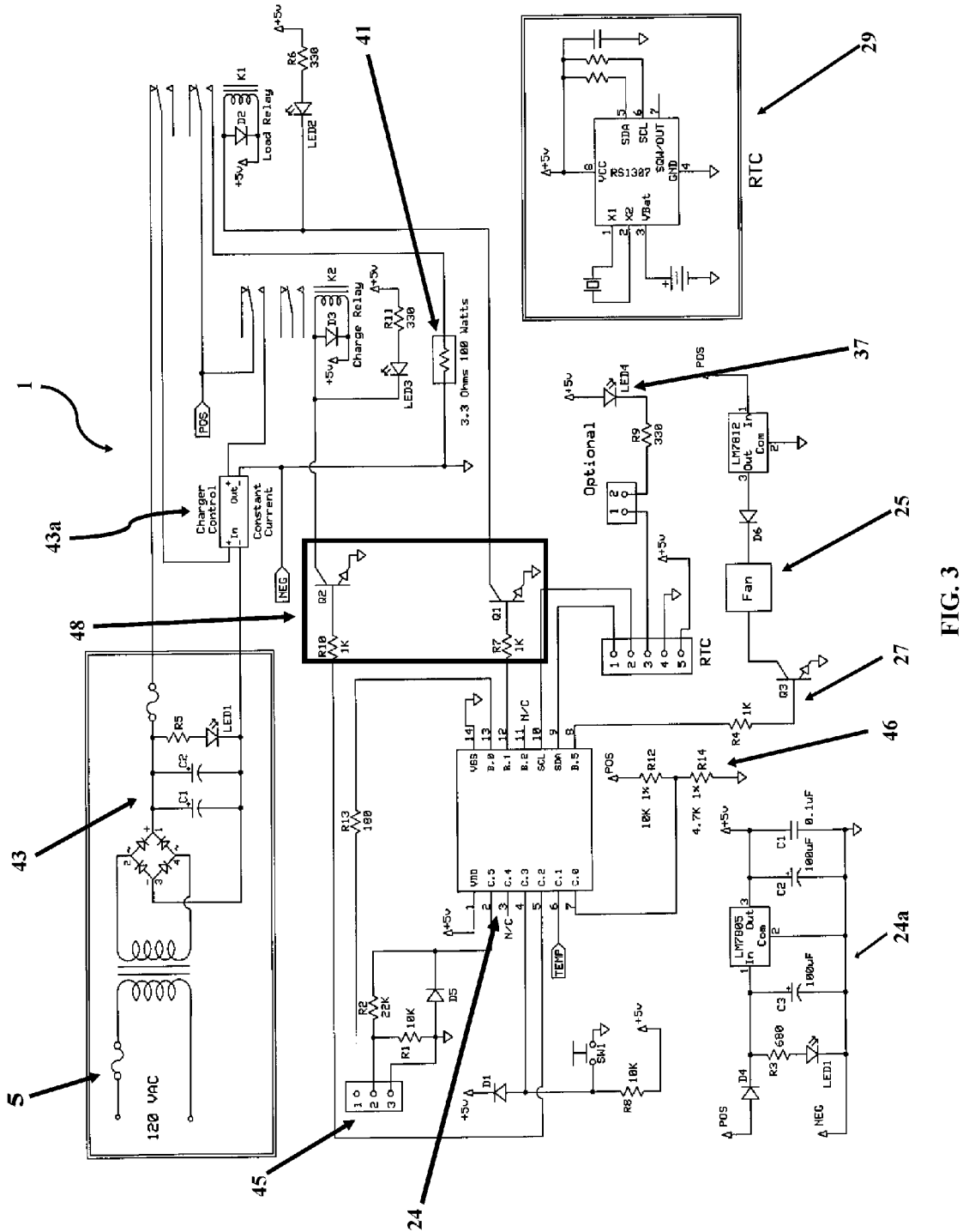
FIG. 3 depicts a circuit diagram of an exemplary circuit system used in the battery exercising device of FIG. 1.

FIG. 3 depicts an exemplary embodiment of a circuit diagram incorporating elements of battery exercising device (1), including diagrammatical features relating to power source (5), processing component (24), real time clock (29), fan (25), fan circuitry (27), light (37), discharge circuit (41), charge circuit (43), and input mechanism (45). The illustrated embodiment also includes a voltage sensing circuit (46) configured to be used to determine the current voltage level of the battery (9). Further, the embodiment illustrated in FIG. 3 includes a relay control (48) for selectively switching between discharge circuit (41) and charge circuit (43) as needed. In the illustrated embodiment, charge circuit (43) is in electrical communication with power source (5) and comprises a charge controller (43a). Charge controller (43a) is configured to regulate the power provided by power source (5) before the charging current is communicated to battery (9). Charge controller (43a) may be configured to regulate the current and/or the voltage of the power being communicated through charge circuit (43). The embodiment illustrated in FIG. 3 also includes a power regulator (24a)

configured to regulate power being provided to processing component (24). Power regulator (24a) may also regulate power being provided to peripheral components connected to processing component (24) as well. Power regulator (24a) may be in electrical communication with power source (5) and battery (9) so that power regulator (24a) can draw power from power source (5) or battery (9) as needed.

Figure 4:
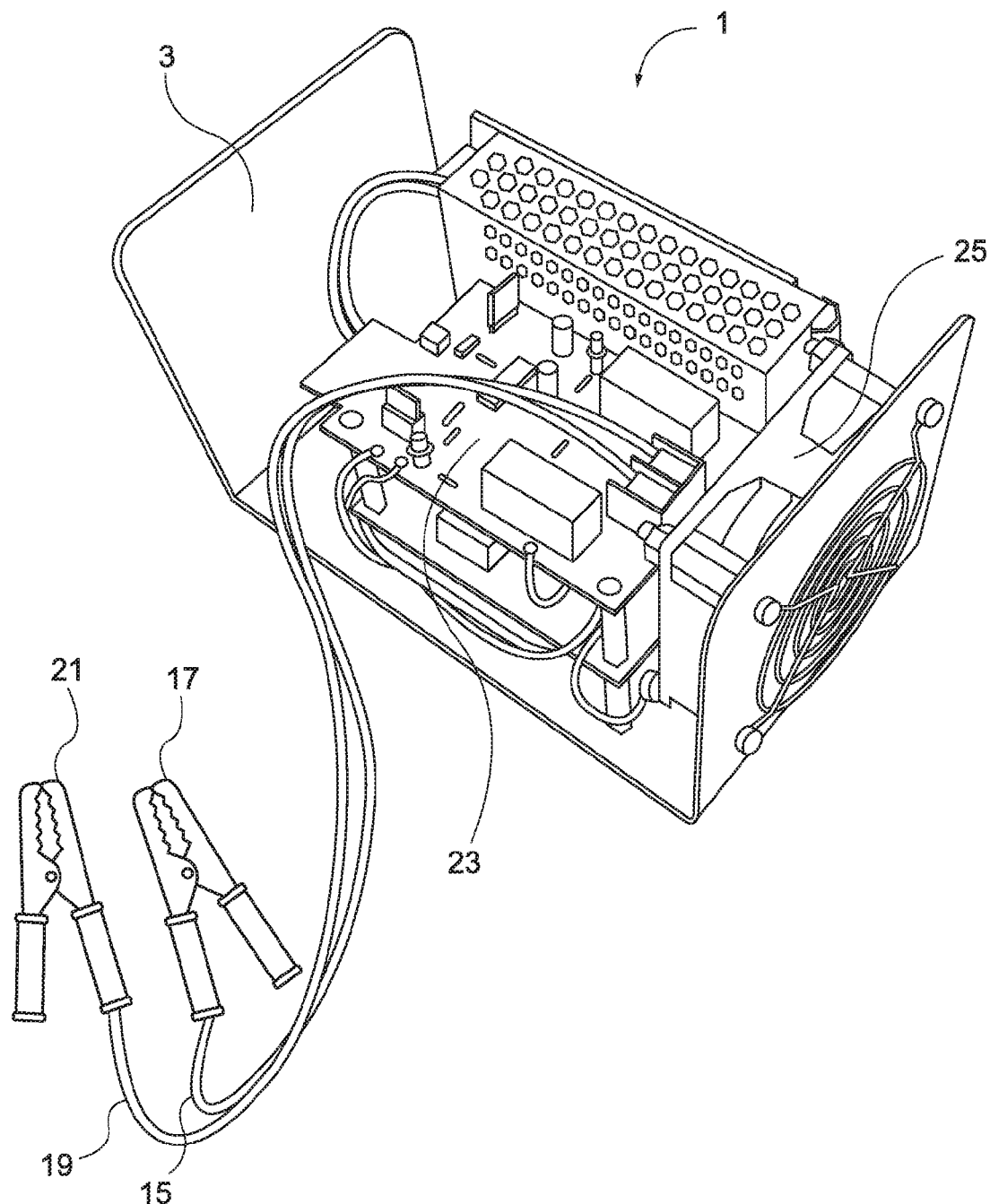
FIG. 4 depicts a perspective view of an exemplary embodiment of the battery exercising device of FIG. 1.

FIG. 4 depicts an exemplary embodiment of battery exercising device (1), showing portions of housing (3) removed and configured into a portable unit. FIG. 4 illustrates embodiments of positive wire (15), positive lead (17), negative wire (19), and negative lead (21). FIG. 4 further illustrates embodiments of control unit (23) and fan (25).

II. Periodic Recharging Method

Figure 2:
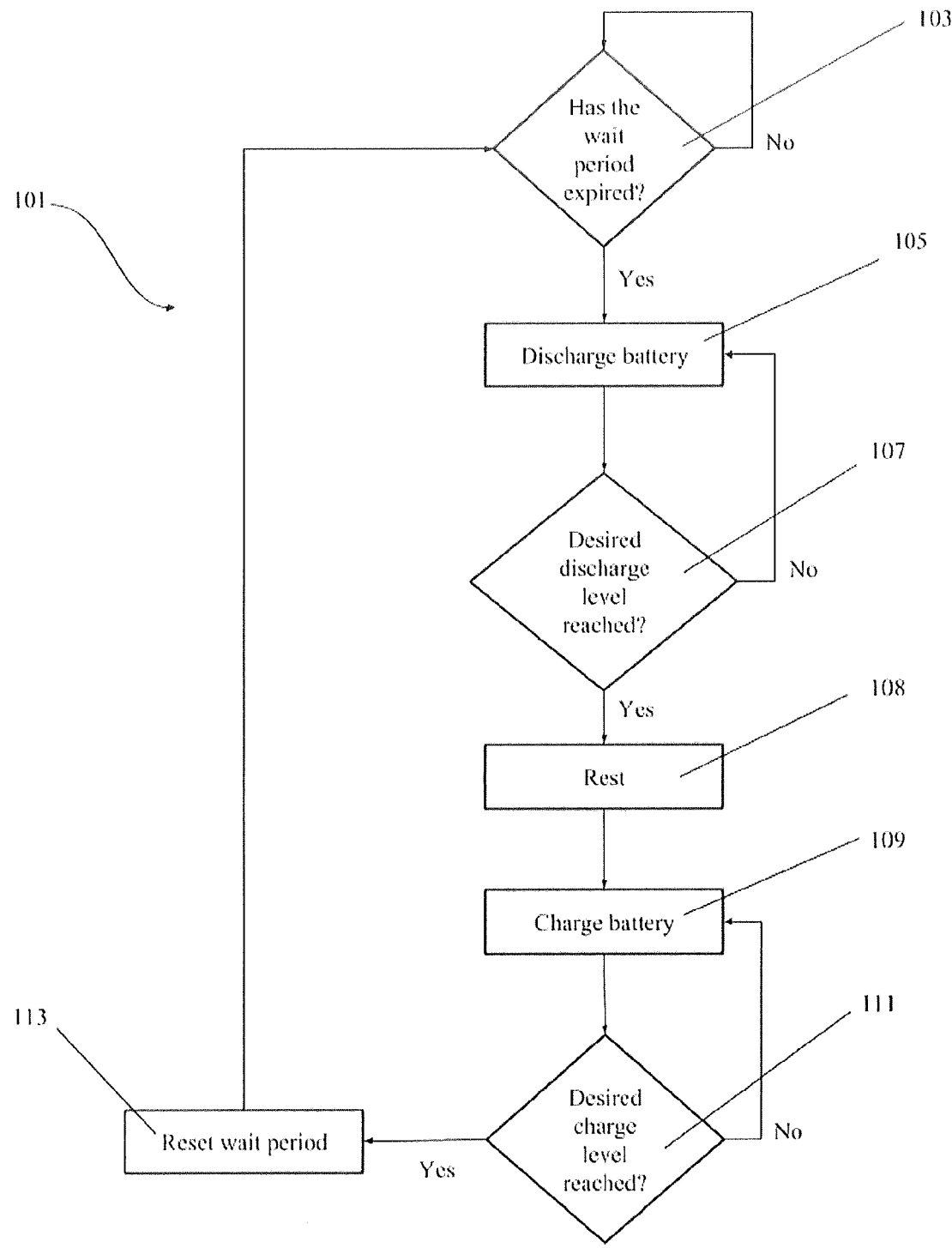
FIG. 2 depicts a flowchart of an exemplary method of using the battery exercising device of FIG. 1.

A method for periodic recharging of a battery, such as rechargeable battery (9) is illustrated in FIG. 2 as periodic recharging method (101). The logic and instructions to complete these steps may be stored in and executed by processing component (24). Battery exercising device (1), and preferably control unit (23), may comprise one or more sensors, timers, and/or counters that may be used to execute various steps within periodic recharging method (101).

As shown, periodic recharging method (101) begins with a wait period check (103) whereby a determination is made as to whether a wait period has elapsed. If the wait period has elapsed, method (101) proceeds to a discharge step (105). If the wait period has not yet elapsed, wait period check (103) repeats. With reference to FIG. 1, the wait period may be set by a user via an input device, such as input mechanism (45), or the wait period may be a pre-set system parameter accessible by control unit (23). Real time clock (29) directs processing component (24) to start a cycle and, subsequently, the processing component (24) tracks the elapsed time. That wait time being tracked by the processing component (24) may then be used in determining whether the wait period has elapsed. The wait period may be a time frame or a specific time/date. In some embodiments, control unit (23) may be programmed to apply a trickle charge to battery (9) during the wait period.

If the wait period has elapsed, then method (101) proceeds to discharge step (105) where the battery is discharged. As discussed above, in discharge step (105) control unit (23) initiates a discharge mode whereby discharge circuit (41) drains the voltage from the battery. Thereafter, method (101) proceeds to a discharge level check (107) whereby a determination is made as to whether the battery has reached the desired discharge level. This determination may be made by polling or sampling the battery voltage to determine the current voltage level of the battery (9) and determining whether the polled voltage level has reached a desired discharge level. By way of example only, the polling may be performed every minute or every thirty seconds, or any other suitable time period. If the battery is fully discharged, method (101) proceeds to a rest step (108). If the battery hasn't yet reached the discharge level, method (101) proceeds back to discharge step (105) to continue discharging the battery. In some embodiments, the user may specify or input a specific time frame for discharging battery (9). By way of example only, the user may specify a three-day time period or any other suitable time frame for discharging battery (9). The time frame for discharging battery (9) may vary depending on the size of battery (9).

If the voltage level has reached the specified discharge level, then method (101) proceeds to rest step (108) where method (101) waits for an amount of time before proceeding to a charge step (109) whereby the battery is charged. As discussed above, in charge step (109) control unit (23) initiates a charging mode whereby charge circuit (43) is utilized to charge the battery. Thereafter, method (101) proceeds to a charge level check (111) whereby a determination is made as to whether the battery has reached the desired charge level. This determination may be made by polling the battery to determine the current voltage level and determining whether the polled voltage level has reached a desired charge level. If the battery has reached the desired charge level, method (101) proceeds to a reset step (113). If the battery has not reached the desired charge level, method (101) proceeds back to charge step (109) to continue charging the battery. In some embodiments, the user may specify or input a specific time frame for charging battery (9). By way of example only, the user may specify a three-day time period or any other suitable time frame for charging battery (9). The time frame for discharging battery (9) may vary depending on the size of battery (9). In some embodiments, the user may be able to select the current being used to charge battery (9) in order to increase or decrease the amount of time required to charge battery (9) to the desired charge level. The user may set and update the current through any common mechanism for interfacing with control unit (23), including through a wired connection, such as a USB port, or through wireless connection, such as a Bluetooth® module. In some embodiments, this may be accomplished via input mechanism (45). Various hardware, circuitry, and/or programming components of battery exercising device (1) may be modified as needed and as known within the art to allow this to be accomplished via input mechanism (45).

In reset step (113) the wait period is reset to begin a new period of waiting. This may be accomplished by clearing a variable stored in a memory associated with control unit (23) or through circuitry or by any other mechanism for resetting the wait period.

III. Method of Operation

Figure 5:
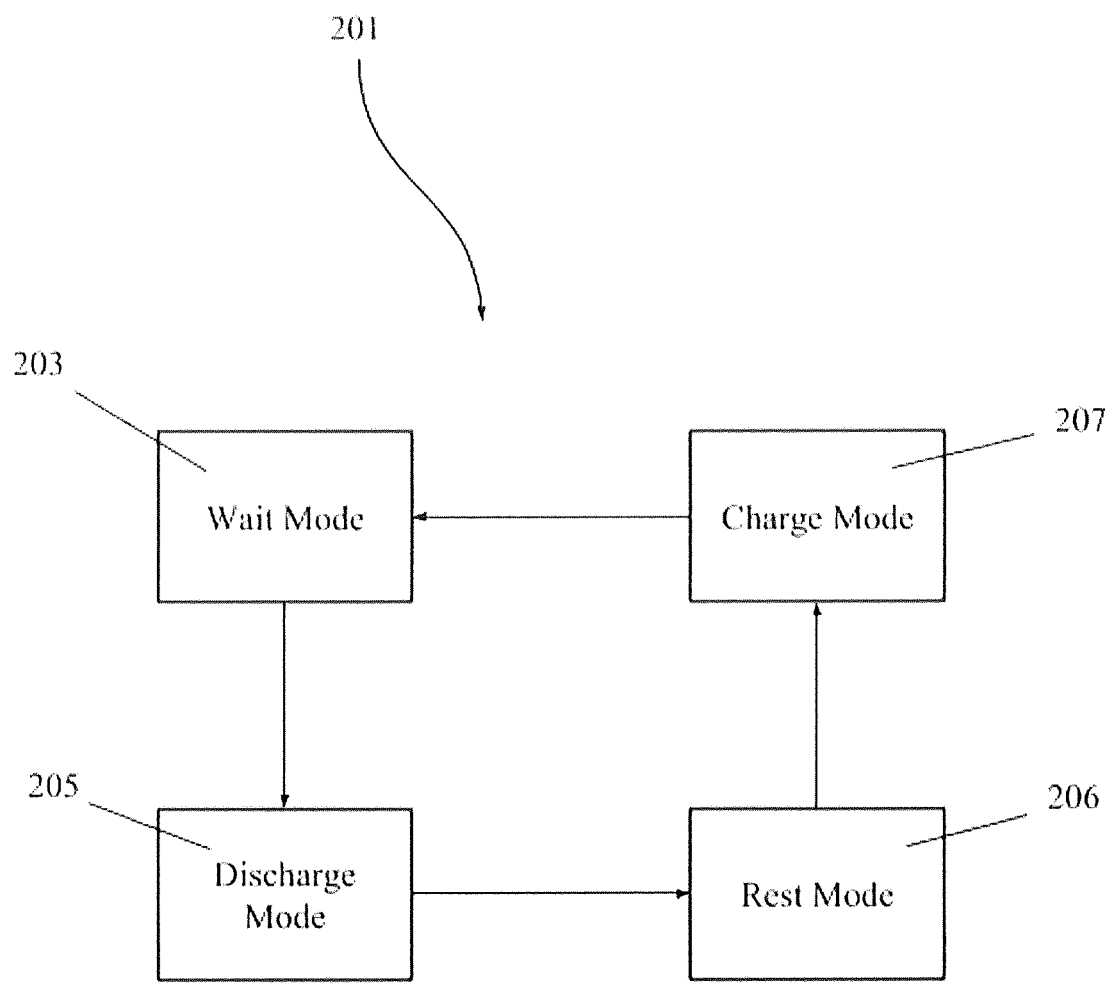
FIG. 5 depicts a diagrammatical view of an exemplary method of operation for the battery exercising device FIG. 1.

A method of operation is illustrated in FIG. 5, and referred to herein after as method of operation (201). Method of operation (201) includes four operation modes, a wait mode (203), a discharge mode (205), a rest mode (206), and a charge mode (207), and battery exercising device (1) may operate between these four modes while battery exercising device (1) is connected with rechargeable battery (9).

In wait mode (203), control unit (23) and real time clock (29) cooperate to determine whether the set wait period has elapsed. When the wait period has elapsed, method of operation (201) transitions from wait mode (203) to discharge mode (205). In some embodiments, exercising device (1) may apply a trickle charge to battery (9) during wait mode (203).

In discharge mode (205), control unit (23) engages discharge circuit (41) to discharge or drain rechargeable battery (9) to the desired discharge level. Once rechargeable battery (9) is sufficiently discharged, method of operation (201) transitions from discharge mode (205) to rest mode (206)

In rest mode (206), battery (9) is stabilized by waiting a period of time and refraining from applying either a charge or discharge current to battery (9). After the predetermined time period for rest mode (206) has elapsed, method of operation (201) transitions to charge mode (207).

In charge mode (207), control unit (23) engages charge circuit (43) to charge rechargeable battery (9) to the desired charge level. Once rechargeable battery (9) is sufficiently charged, method of operation (201) transitions back to wait mode (203) to repeat method of operation (201) or until either power source (5) or rechargeable battery (9) is disconnected from battery exercising device (1).

IV. Using a Battery Exercising Device in Conjunction with a Standalone Charger

Figure 6A:
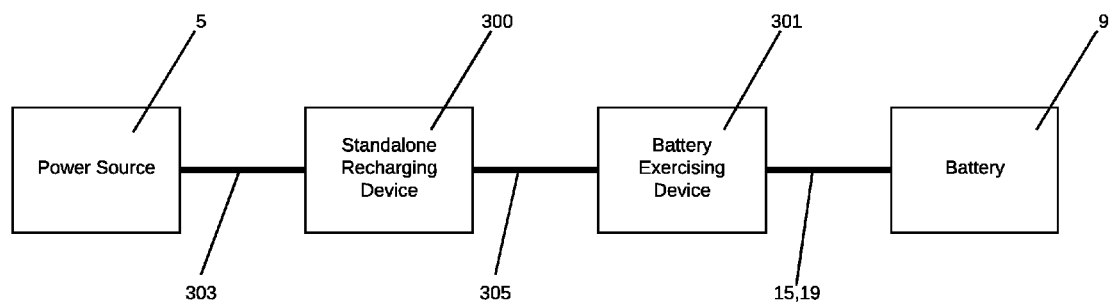
FIG. 6A depicts a diagrammatical view of an exemplary arrangement of one embodiment of a battery exercising device connected to a standalone recharging device.
Figure 6B:
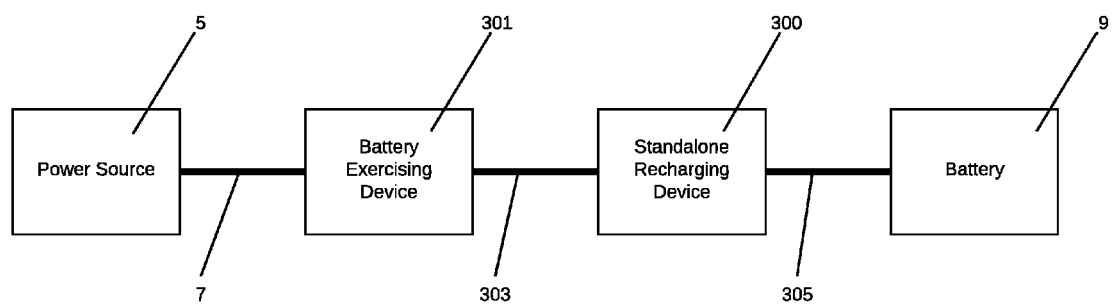
FIG. 6B depicts a diagrammatical view of an alternate arrangement of another embodiment of a battery exercising device connected to a standalone recharging device.

As shown in FIGS. 6A and 6B, embodiments of battery exercising device may be configured for use with a conventional or "off-the-shelf" standalone recharging device (300). By way of example only, standalone recharging device (300) could comprise Lester®, Sears®, or Schumacher® branded recharging devices (300). These embodiments of battery exercising device, referred to hereinafter as battery exercising device (301), may be configured to leverage the discharging and charging capabilities of ready-made components and charging devices, such as standalone recharging device (300). Typical off-the-shelf standalone recharging devices, such as recharging device (300), do not discharge the battery. Therefore, battery exercising device (301) is configured to perform the discharge cycle when used in conjunction with those types of off-the-shelf standalone recharging devices.

Standalone recharging device (300) includes a power cord (303) for connecting with a power source. As shown in FIG. 6A, in some embodiments of battery exercising device (301), standalone recharging device (300) receives power directly from power source (5) through power cord (303). Battery exercising device (301) is electrically connected to standalone recharging device (300) by a connector (305), whereby connector (305) facilitates the passing of the charge current from standalone recharging device (300) to battery exercising device (301). Connector (305) may be standard alligator clips or any other mechanism for coupling standalone recharging device (300) with another element. In some embodiments of this configuration, standalone recharging device (300) is constantly providing charging current through connector (305), with battery exercising device (301) allowing this charging current to pass through to battery (9) via positive wire (15) and negative wire (19) only after the expiration of the wait period. In other embodiments, battery exercising device (301) actuates standalone recharging device (300) to start charging at the expiration of the wait period and passes this charging current there through, using positive wire (15) and negative wire (19). In some embodiments, standalone recharging device (300) may comprise a smart charger, capable of independently monitoring and regulating charging characteristics such as voltage and percentage of battery charge and a device that uses constant current and then constant voltage to recharge a battery electrically coupled to the standalone recharging device (300). In some embodiments, standalone recharging device (300) is not configured to discharge battery (9). In this scenario, battery exercising device (301) initiates a discharge cycle directly from battery exercising device (301) to battery (9) after the wait period is expired and prior to passing the charge current from standalone recharging device (300) to battery (9).

As shown in FIG. 6B, in other embodiments, standalone charging device (300) receives power indirectly from power source (5) through battery exercising device (301), whereby power cord (303) is connected to battery exercising device (301), and battery exercising device (301) is connected directly to power source (5) via power cord (7). Upon the expiration of the wait period, battery exercising device (301) provides power to standalone recharging device (300), thus enabling standalone recharging device (300) to charge battery (9).

As shown in FIGS. 6A and 6B, in either configuration, battery exercising device (301) acts as a gatekeeper for selectively supplying or actuating a discharge/charge cycle in conjunction with standalone recharging device (300) at the expiration of the wait period. Other embodiments may include similar configurations whereby battery exercising device (301) actuates standalone recharging device (300) to charge battery (9) upon the expiration of the wait period. For example, battery exercising device (301) and standalone recharging device (300) may both be connected directly to power source (5), with battery exercising device (301) controlling the output of standalone recharging device (300) to battery (9) to ensure the wait period is enforced. Battery exercising device (301) may control or actuate output of standalone recharging device (300) through control sensing feedback using leads or other elements.

V. Using a Battery Exercising Device with Multiple Batteries

Figure 7:
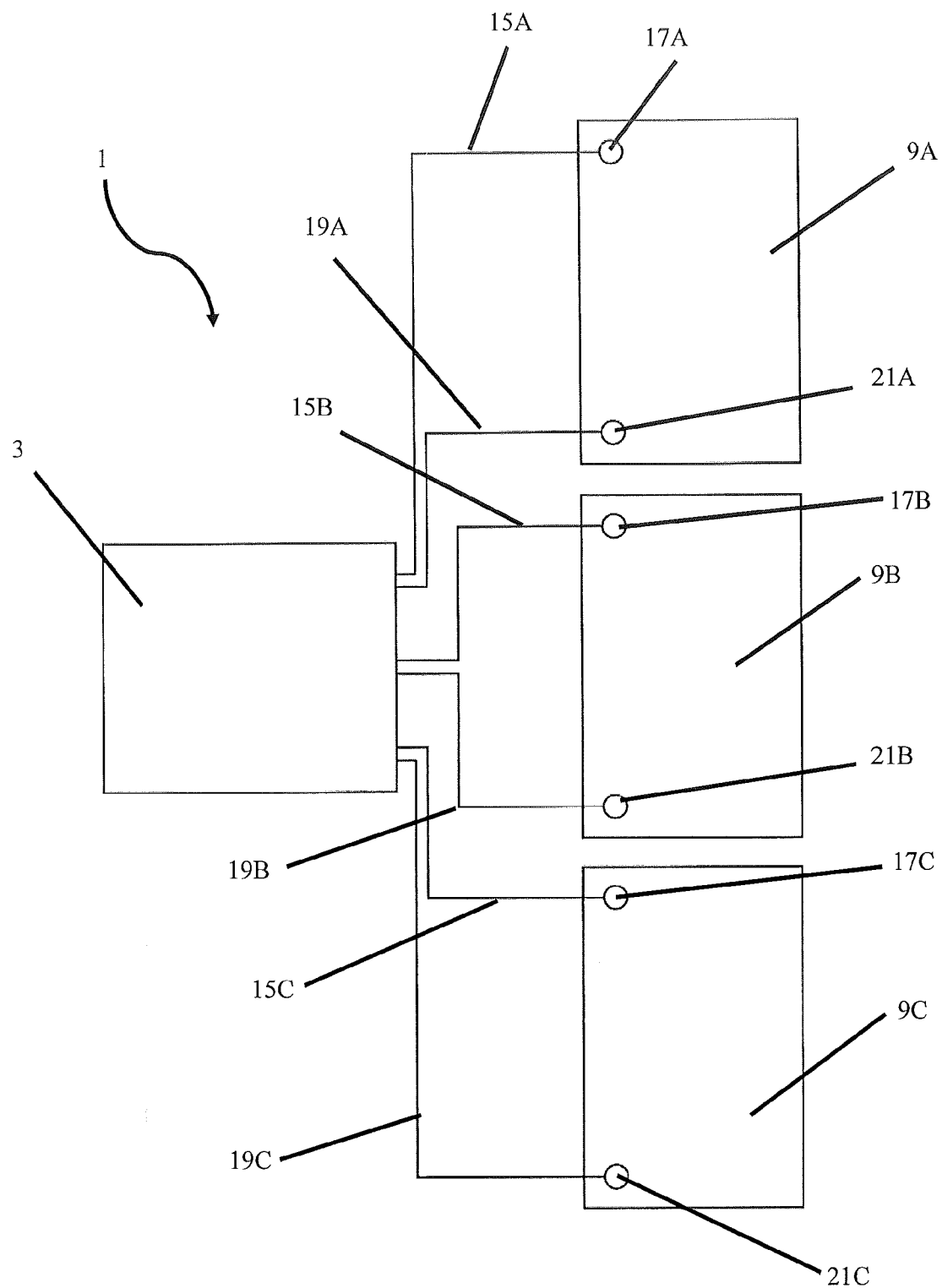
FIG. 7 depicts a diagrammatical view of an exemplary arrangement of one embodiment of a battery exercising device connected to three rechargeable batteries.

FIG. 7 illustrates an embodiment of battery exercising device (1) connected to three batteries, namely, battery (9A), battery (9B), and battery (9C). In this embodiment, battery exercising device (1) is coupled with battery (9A) through positive wire (15A) and negative wire (19A). Similarly, battery exercising device (1) is coupled with battery (9B) through positive wire (15B) and negative wire (19B) and coupled with battery (9C) through positive wire (15C) and negative wire (19C). In this embodiment, battery exercising device (1) may provide discharging and charging to each of battery (9A), battery (9B), and battery (9C). While the embodiment shown in FIG. 7 includes three batteries (9A, 9B, 9C), other embodiments may include two batteries or four or more batteries.

In embodiments that include two or more batteries, battery exercising device (1) may be configured to charge and discharge multiple independent batteries sequentially or batteries electrically connected in a series or parallel configuration simultaneously. Specifically, control unit (23) may be programmed to simultaneously discharge each of the batteries to a respective discharge level, which may or may not be the same for each battery, and then simultaneously charge each of the batteries to a respective charge level, which may or may not be the same for each battery. Alternatively, control unit (23) may be programmed and include additional switching circuitry to discharge the first battery to a first discharge level and then charge the first battery to a first charge level, while the remaining battery or batteries are waiting to be exercised (i.e., while control unit (23) is in wait mode with respect to the other battery or batteries). Subsequently, once the first battery has been exercised (i.e., discharged to the first discharge level and charged to the first charge level), then control unit (23) may be programmed to begin discharging the second battery to a second discharge level, and so on, until each of the batteries has been exercised in sequence. There may be a respective wait period associated with each of the batteries as well.

VI. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A battery exercising device comprising a housing; a real time clock disposed in the housing; a discharge circuit operable to allow the battery exercising device to selectively discharge a rechargeable battery; a charge circuit operable to allow the battery exercising device to selectively charge the rechargeable battery; and a control unit, wherein the control unit is in communication with the real time clock such that the control unit receives timing data from the real time clock, wherein the control unit comprises a processing component, wherein the control unit is programmed to determine if a wait period has elapsed based on the timing data received from the real time clock, wherein the control unit is further programmed to discharge the rechargeable battery to a predetermined discharge level via the discharge circuit if the control unit determines the wait period has elapsed, wherein the control unit is further programmed to charge the rechargeable battery to a predetermined charge level via the charge circuit after the rechargeable battery has been discharged to the predetermined discharge level.

EXAMPLE 2

The battery exercising device of Example 1 or any of the following Examples, wherein the wait period is configurable by a user.

EXAMPLE 3

The battery exercising device of any of the preceding or following Examples, further comprising an input mechanism, wherein the input mechanism is in communication with the control unit, wherein the wait period is configurable by the user through actuation of the input mechanism.

EXAMPLE 4

The battery exercising device of any of the preceding or following Examples, wherein the discharge level is greater than zero volts.

EXAMPLE 5

The battery exercising device of any of the preceding or following Examples, further comprising an input mechanism, wherein the input mechanism comprises an external device configured to communicate with the control unit via a wireless connection between the input mechanism and the control unit.

EXAMPLE 6

The battery exercising device of any of the preceding or following Examples, further comprising a feedback mechanism, wherein the feedback mechanism is in communication with the control unit, wherein the feedback mechanism is configured to provide feedback, to a user regarding at least one piece of information about at least one of the battery exercising device and the rechargeable battery.

EXAMPLE 7

The battery exercising device of any of the preceding or following Examples, wherein the feedback mechanism comprises a light.

EXAMPLE 8

The battery exercising device of any of the preceding or following Examples, wherein the control unit is programmed to illuminate the light in a first color when the control unit is discharging the rechargeable battery, and wherein the control unit is further programmed to illuminate the light in a second color when the control unit is charging the rechargeable battery, wherein the first color is different than the second color.

EXAMPLE 9

The battery exercising device of any of the preceding or following Examples, wherein the feedback mechanism is an audio message.

EXAMPLE 10

The battery exercising device of any of the preceding or following Examples, wherein the processing component comprises at least one of a microcontroller and a microprocessor.

EXAMPLE 11

The battery exercising device of any of the preceding or following Examples, further comprising a positive wire and a negative wire extending from the housing, wherein the positive wire comprises a positive lead at a distal end of the positive wire, wherein the negative wire comprises a negative lead at a distal end of the negative wire.

EXAMPLE 12

A battery exercising device comprising: a real time clock; a discharge circuit operable to allow the battery exercising device to selectively discharge a rechargeable battery; a charge circuit operable to allow the battery exercising device to selectively charge the rechargeable battery; and a control unit, wherein the control unit is in communication with the real time clock such that the control unit receives timing data from the real time clock, wherein the control unit comprises a processing component, wherein the control unit is programmed to transition from a wait mode to a discharge mode in response to determining that a wait period has elapsed, wherein the discharge mode comprises an operation mode wherein the control unit discharges the rechargeable battery via the discharge circuit, wherein the control unit is further programmed to transition from the discharge mode to a charge mode in response to determining that the rechargeable battery has been discharged to a predetermined discharge level, wherein the charge mode comprises an operation mode wherein the control unit charges the rechargeable battery via the charge circuit.

EXAMPLE 13

The battery exercising device of any of the preceding or following Examples, wherein the control unit is further programmed to transition to a rest mode after completing the discharge mode and before transitioning to the charge mode.

EXAMPLE 14

The battery exercising device of any of the preceding or following Examples, further comprising an input mechanism, wherein the input mechanism is in communication with the control unit, wherein at least one of the discharge level and the charge level is configurable by a user through actuation of the input mechanism.

EXAMPLE 15

The battery exercising device of any of the preceding or following Examples, wherein the control unit is further programmed to apply a trickle charge to the rechargeable battery when the control unit is in the wait mode.

EXAMPLE 16

The battery exercising device of any of the preceding or following Examples, wherein the wait period comprises at least two weeks.

EXAMPLE 17

The battery exercising device of any of the preceding or following Examples, further comprising an input mechanism, wherein the input mechanism is in communication with the control unit, wherein the control unit is further programmed to transition to a discharge mode in response to a corresponding input provided via the input mechanism, wherein the control unit is further programmed to transition to a charge mode in response to a corresponding input provided via the input mechanism.

EXAMPLE 18

A battery system comprising: a first rechargeable battery; a battery exercising device, wherein the battery exercising device is electrically coupled to the first rechargeable battery, wherein the battery exercising device comprises a real time clock, and a control unit, wherein the control unit is in communication with the real time clock such that the control unit receives timing data from the real time clock, wherein the control unit comprises a processing component, wherein the control unit is programmed to determine if a first wait period has elapsed based on the timing data received from the real time clock, wherein the control unit is further programmed to discharge the first rechargeable battery if the control unit determines the first wait period has elapsed, wherein the control unit is further programmed to charge the first rechargeable battery after the first rechargeable battery has been discharged to a predetermined first discharge level.

EXAMPLE 19

The battery system of any of the preceding or following Examples, further comprising a second rechargeable battery, wherein the battery exercising device is electrically coupled to the second rechargeable battery, wherein the control unit is further programmed to determine if a second wait period has elapsed based on the timing data received from the real time clock, wherein the control unit is further programmed to discharge the second rechargeable battery if the control unit determines the second wait period has elapsed, wherein the control unit is further programmed to charge the second rechargeable battery after the second rechargeable battery has been discharged to a predetermined second discharge level.

EXAMPLE 20

The battery system of any of the preceding or following Examples, further comprising a standalone recharging device, wherein the standalone recharging device is electrically connected to the battery exercising device.

EXAMPLE 21

The battery exercising device of any of the preceding Examples, wherein the battery exercising device is configured to be used in conjunction with a lead-acid battery.

VII. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometric s, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A battery exercising device comprising:
a timing element;
a discharge circuit operable to allow the battery exercising device to selectively discharge a rechargeable battery;
a charge circuit operable to allow the battery exercising device to selectively charge the rechargeable battery; and
a control unit, wherein the control unit is in communication with the timing element such that the control unit receives timing data from the timing element,
wherein the control unit comprises a processing component,
wherein the control unit is programmed to determine if a wait period has elapsed based on the timing data received from the timing element,
wherein the control unit is further programmed to discharge the rechargeable battery to a predetermined discharge level via the discharge circuit if the control unit determines the wait period has elapsed,
wherein the control unit is further programmed to charge the rechargeable battery to a predetermined charge level via the charge circuit after the rechargeable battery has been discharged to the predetermined discharge level.

2. The battery exercising device of claim 1, further comprising a power source in electrical communication with the control unit.

3. The battery exercising device of claim 2, wherein the power source is selected from the group consisting of a conventional electrical outlet, a solar panel, and a wind turbine.

4. The battery exercising device of claim 1, wherein the processing component comprises at least one of a microcontroller and a microprocessor.

5. The battery exercising device of claim 1, further comprising a feedback mechanism, wherein the feedback mechanism is in communication with the control unit, wherein the feedback mechanism is configured to provide feedback, to a user regarding at least one piece of information about at least one of the battery exercising device and the rechargeable battery.

6. The battery exercising device of claim 1, further comprising an input mechanism, wherein the input mechanism is in communication with the control unit, wherein the wait period is configurable by the user through actuation of the input mechanism.

7. The battery exercising device of claim 1, wherein the control unit is further programmed to wait for a predetermined rest time limit after discharging the rechargeable battery to the predetermined discharge level before charging the rechargeable battery.

8. The battery exercising device of claim 1, wherein the timing element comprises a clock.

9. The battery exercising device of claim 1, wherein the timing element comprises a real time clock.

10. A battery exercising device comprising:
a timing element;
a discharge circuit operable to allow the battery exercising device to selectively discharge a rechargeable battery;
a charge circuit operable to allow the battery exercising device to selectively charge the rechargeable battery; and
a control unit, wherein the control unit is in communication with the timing element such that the control unit receives timing data from the timing element,
wherein the control unit comprises a processing component,
wherein the control unit is programmed to determine if a wait period has elapsed based on the timing data received from the timing element,
wherein the control unit is further programmed to discharge the rechargeable battery via the discharge circuit if the control unit determines the wait period has elapsed, wherein the control unit is further programmed to discharge the rechargeable battery to a predetermined discharge level or until a predetermined discharge time limit elapses,
wherein the control unit is further programmed to charge the rechargeable battery via the charge circuit after the predetermined discharge level has been reached or the predetermined discharge time limit has elapsed, wherein the control unit is further programmed to charge the rechargeable battery to a predetermined charge level or until a predetermined charge time limit elapses.

11. The battery exercising device of claim 10, further comprising an input mechanism, wherein the input mechanism is in communication with the control unit, wherein at least one of the discharge level, the charge level, the predetermined discharge time limit, or the predetermined charge time limit is configurable by a user through actuation of the input mechanism.

12. The battery exercising device of claim 10, further comprising an input mechanism, wherein the input mechanism is in communication with the control unit, wherein the wait period is configurable by the user through actuation of the input mechanism.

13. The battery exercising device of claim 10, wherein the control unit is further programmed to wait for a predetermined rest time limit after discharging the rechargeable battery to the predetermined discharge level or for the predetermined discharge time limit before charging the rechargeable battery.

14. The battery exercising device of claim 13, wherein the control unit is further programmed to charge the rechargeable battery to the predetermined charge level or for the predetermined charge time limit after the predetermined rest time limit elapses.

15. The battery exercising device of claim 10, further comprising a feedback mechanism, wherein the feedback mechanism is in communication with the control unit, wherein the feedback mechanism is configured to provide feedback, to a user regarding at least one piece of information about at least one of the battery exercising device and the rechargeable battery.

16. A battery system comprising:
a first rechargeable battery;
a battery exercising device, wherein the battery exercising device is electrically coupled to the first rechargeable battery, wherein the battery exercising device comprises
a timing element, and
a control unit, wherein the control unit is in communication with the timing element such that the control unit receives timing data from the timing element, wherein the control unit comprises a processing component, wherein the control unit is programmed to determine if a first wait period has elapsed based on the timing data received from the timing element, wherein the control unit is further programmed to discharge the first rechargeable battery if the control unit determines the first wait period has elapsed, wherein the control unit is further programmed to charge the first rechargeable battery after the first rechargeable battery has been discharged to a first predetermined discharge level or until a first predetermined discharge time limit elapses.

17. The battery system of claim 16, wherein the control unit is further programmed to charge the first rechargeable battery to a first predetermined charge level or until a first predetermined charge time limit elapses.

18. The battery system of claim 16, further comprising a second rechargeable battery, wherein the battery exercising device is electrically coupled to the second rechargeable battery, wherein the control unit is further programmed to determine if a second wait period has elapsed based on the timing data received from the timing element, wherein the control unit is further programmed to discharge the second rechargeable battery if the control unit determines the second wait period has elapsed, wherein the control unit is further programmed to charge the second rechargeable battery after the second rechargeable battery has been discharged to a second predetermined discharge level or until a second predetermined discharge time limit elapses.

19. The battery system of claim 18, wherein the control unit is further programmed to charge the second rechargeable battery to a second predetermined charge level or until a second predetermined charge time limit elapses.

20. The battery system of claim 16, further comprising a standalone recharging device, wherein the standalone recharging device is electrically connected to the battery exercising device.

* * * * *